United States Patent
Mittal et al.

(10) Patent No.: US 10,289,940 B2
(45) Date of Patent: May 14, 2019

(54) METHOD AND APPARATUS FOR PROVIDING CLASSIFICATION OF QUALITY CHARACTERISTICS OF IMAGES

(71) Applicant: HERE GLOBAL B.V., Veldhoven (NL)

(72) Inventors: Anish Mittal, Berkeley, CA (US); William Marks, San Francisco, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/752,253

(22) Filed: Jun. 26, 2015

(65) Prior Publication Data

US 2016/0379094 A1 Dec. 29, 2016

(51) Int. Cl.
*G06K 9/66* (2006.01)
*G06K 9/03* (2006.01)
*G06K 9/20* (2006.01)
*G06K 9/46* (2006.01)

(52) U.S. Cl.
CPC ............... *G06K 9/66* (2013.01); *G06K 9/036* (2013.01); *G06K 9/2054* (2013.01); *G06K 9/4642* (2013.01); *G06K 9/4661* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 2008/0226148 A1* | 9/2008 | Gu | G06T 5/007 382/128 |
| 2008/0285860 A1* | 11/2008 | Datta | G06K 9/00624 382/224 |
| 2012/0269441 A1* | 10/2012 | Marchesotti | G06N 99/005 382/195 |
| 2013/0142451 A1* | 6/2013 | Reibman | G06T 7/0002 382/284 |
| 2014/0133764 A1* | 5/2014 | Hong | G06F 17/30244 382/224 |

(Continued)

OTHER PUBLICATIONS

Datta, Ritendra, et al. "Studying aesthetics in photographic images using a computational approach." Computer Vision—ECCV 2006. Springer Berlin Heidelberg, 2006. 288-301. 14 pages.*

(Continued)

*Primary Examiner* — Ryan P Potts
(74) *Attorney, Agent, or Firm* — Ditthavong & Steiner, P.C.

(57) ABSTRACT

An approach is provided for automated analysis and classification of quality characteristics associated with captured imagery that may be used in an application such as a map application. The approach includes determining digital data associated with a region of interest in an image. The approach also comprises processing and/or facilitating a processing of the digital data to determine one or more quality attributes associated with the region of interest. The approach further comprises causing, at least in part, a comparison of the one or more quality attributes to one or more criteria. The approach also comprises causing, at least in part, a generation of one or more classifications for the image based, at least in part, on the comparison.

15 Claims, 15 Drawing Sheets

(56) References Cited

U.S. PATENT DOCUMENTS

2015/0213609 A1* 7/2015 Lin ................... G06T 7/0081
 382/173

OTHER PUBLICATIONS

Ke, Yan, Xiaoou Tang, and Feng Jing. "The design of high-level features for photo quality assessment." Computer Vision and Pattern Recognition, 2006 IEEE Computer Society Conference on. vol. 1. IEEE, 2006. 8 pages.*

De Faria, Joao Maques. ""What Makes a Good Picture?"." Thesis. Cranfield Uiversity, 2012. Aug. 15, 2012. Web. Apr. 29, 2016. <https://repositorio-aberto.up.pt/bitstream/10216/68163/1/000155138.pdf>. 126 pages.*

Reaves, David. Aesthetic image rating (AIR) algorithm. Diss. Ph. D. thesis, 2008. 35 pages.*

Ojansivu, Ville, et al. "Degradation based blind image quality evaluation." Image Analysis. Springer Berlin Heidelberg, 2011. 306-316. 11 pages.*

Moorthy, Anush Krishna, and Alan Conrad Bovik. "Visual quality assessment algorithms: what does the future hold?." Multimedia Tools and Applications 51.2 (2011): 675-696. 22 pages.*

Wang et al., "Image Quality Assessment: From Error Visibility to Structural Similarity", IEEE Transactions on Image Processing, vol. 13, No. 4, Apr. 2004, pp. 600-612.

Chang et al., "LIBSVM: A library for support vector machines", ACM Transactions on Intelligent Systems and Technology, (TIST) vol. 2, Issue 3, Apr. 2011, Article No. 27, pp. 1-39.

Yuan et al., "Automatic Exposure Correction of Consumer Photographs", In Proceedings of the 12th European conference on Computer Vision—ECCV, Springer Berlin Heidelberg, 2012, pp. 771-785.

* cited by examiner

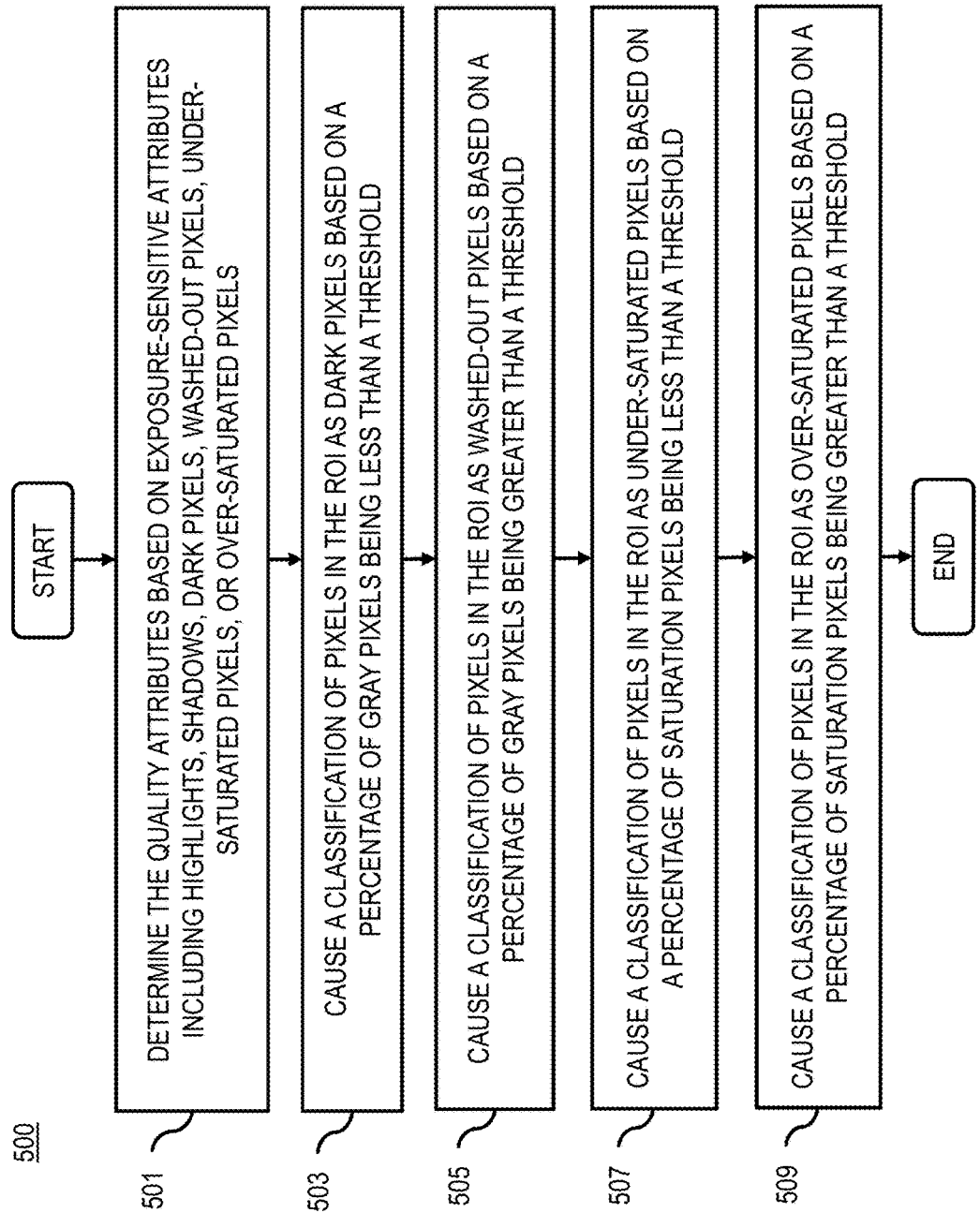

610

FIG. 6C    620

630

METHOD AND APPARATUS FOR PROVIDING CLASSIFICATION OF QUALITY CHARACTERISTICS OF IMAGES

BACKGROUND

Service providers and device manufacturers (e.g., wireless, cellular, etc.) are continually challenged to deliver value and convenience to consumers by, for example, offering high resolution digital map contents featuring true street view perspectives and satellite data to consumers and enterprise customers. The contents may be utilized by user devices (e.g., mobile phones, tablets, laptop computers, etc.) or embedded systems (e.g., navigation systems) in vehicles to provide functionalities for route planning, asset maintenance, automated driving, etc. However, due to time and human resource constraints, only a small portion of a vast number of images may be examined, leaving large gaps in analysis that may allow poor quality imagery to be provided for use in different applications. As a result, service providers face significant technical challenges in accurate and efficient analysis and classification of quality characteristics of available imagery.

SOME EXAMPLE EMBODIMENTS

Therefore, there is a need for an approach for automated analysis and classification of quality characteristics associated with captured imagery.

According to one embodiment, a method comprises determining digital data associated with a region of interest (ROI) in an image. The method also comprises processing and/or facilitating a processing of the digital data to determine one or more quality attributes associated with the ROI. The method further comprises causing, at least in part, a comparison of the one or more quality attributes to one or more criteria. The method also comprises causing, at least in part, a generation of one or more classifications for the image based, at least in part, on the comparison.

According to another embodiment, an apparatus comprises at least one processor, and at least one memory including computer program code for one or more computer programs, the at least one memory and the computer program code configured to, with the at least one processor, cause, at least in part, the apparatus to determine digital data associated with a ROI in an image. The apparatus is also caused to process and/or facilitate a processing of the digital data to determine one or more quality attributes associated with the ROI. The apparatus is further caused to cause, at least in part, a comparison of the one or more quality attributes to one or more criteria. The apparatus is also caused to cause, at least in part, a generation of one or more classifications for the image based, at least in part, on the comparison.

According to another embodiment, a computer-readable storage medium carries one or more sequences of one or more instructions which, when executed by one or more processors, cause, at least in part, an apparatus to determine digital data associated with a ROI in an image. The apparatus is also caused to process and/or facilitate a processing of the digital data to determine one or more quality attributes associated with the ROI. The apparatus is further caused to cause, at least in part, a comparison of the one or more quality attributes to one or more criteria. The apparatus is also caused to cause, at least in part, a generation of one or more classifications for the image based, at least in part, on the comparison.

According to another embodiment, an apparatus comprises means for determining digital data associated with a ROI in an image. The apparatus also comprises means for processing and/or facilitating a processing of the digital data to determine one or more quality attributes associated with the ROI. The apparatus further comprises means for causing, at least in part, a comparison of the one or more quality attributes to one or more criteria. The apparatus also comprises means for causing, at least in part, a generation of one or more classifications for the image based, at least in part, on the comparison.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 through 5 are flowcharts of various processes for, at least, automated analysis and classification of quality characteristics associated with captured imagery, according to various embodiments;

FIGS. 6A through 6G illustrate example captured imagery including a wide range of exposure levels and physical environments, according to various embodiments;

DESCRIPTION OF SOME EMBODIMENTS

Examples of a method, apparatus, and computer program for automated analysis and classification of quality characteristics associated with captured imagery for use in map applications, navigation systems, etc., are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to automated analysis and classification of quality characteristics associated with captured imagery, it is contemplated that the approach described herein may be applicable to any invention that can be modelled according the example processes described below and can benefit from automated analysis and classification of quality characteristics associated with captured imagery for use in map applications, navigation systems, infotainment, etc.

Figure 1:
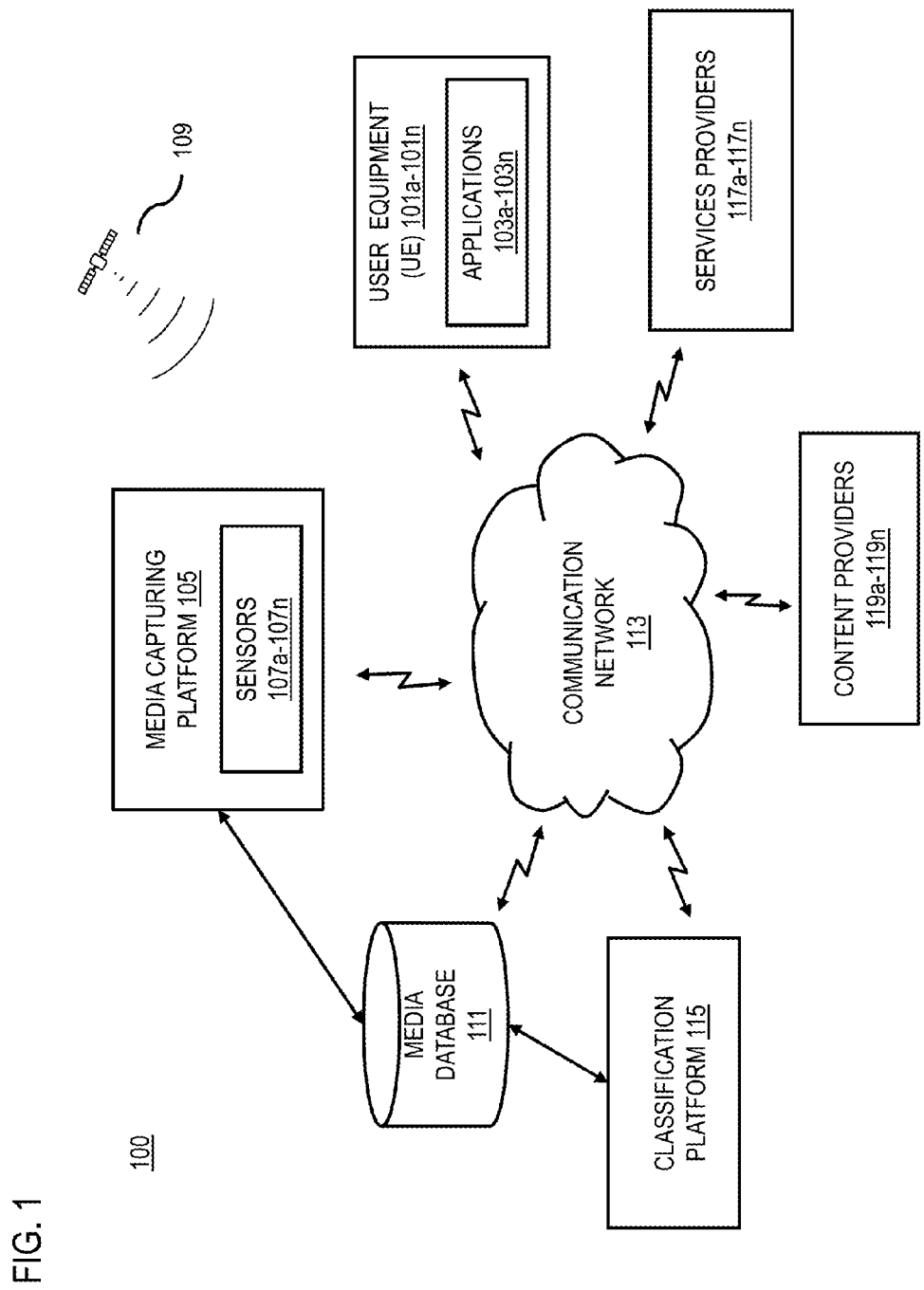
FIG. 1 is a diagram of a system capable of automated analysis and classification of quality characteristics associated with captured imagery, according to one embodiment.

FIG. 1 is a diagram of a system capable of automated analysis and classification of quality characteristics associated with captured imagery for use in map applications, navigation systems, infotainment, etc., according to one embodiment. As previously discussed, one area of interest among service providers and device manufacturers has been accurate and efficient collection and processing of geo-location imagery and data that may be used by content/service providers in providing a variety of services to users (e.g., maps, navigation services, etc.) or offered to enterprise customers for their use. Quality control of the contents is integral to providing the best customer experience. With respect to quality of an image, human vision and intellect is capable of scrutinizing various characteristics in the image; for instance, exposure levels, color balance/saturation, blurriness, presence and types of objects in the image, or the like characteristics. Hence, some content and service providers employ dedicated quality assurance teams that are assigned with the task of manually examining imagery (e.g., images captured/provided by a content/service provider) to qualitatively assess their quality characteristics. However, due to time and human resource constraints, only a small portion of a vast number of images may be examined, leaving large gaps in analysis that may allow poor quality imagery to be made available for use.

To solve this problem, system 100 can provide support for automated analysis and classification of quality characteristics associated with available imagery. In some instances, service or content providers may utilize various methods (e.g., camera equipment on a vehicle) to capture images of geo-locations and points of interest (POIs), e.g., streets, buildings, open spaces, etc., that may be used by different applications or services. As noted, quality characteristics of the images may vary as the images may have been captured at different times of a day (e.g., morning, afternoon, etc.), in different environmental conditions (e.g., sunny, cloudy, etc.), at different geo-locations (e.g., open space, near tall buildings/trees, etc.), by use of different equipment, or due to other factors. Some quality characteristics of an image may be based on an exposure level, indicating the amount of light recorded from a subject in the image (e.g., on a photographic film, a digital sensor, etc.) Generally, the exposure level of an image may be within a dynamic range, wherein out-of-range levels may cause all or portions of an image to be underexposed (e.g., dark), overexposed (e.g., light or washed-out), under-saturated (e.g., lighter levels of color), over-saturated (e.g., darker levels of color), or to have similar effects.

In one scenario, the system 100 may utilize one or more machine learning algorithms to analyze and determine the exposure level of an image by using a database including exposure level information on various images where the information may include subjective exposure level judgements/scores input by human inspectors. An algorithm may analyze or compute features relating to shadows, highlights, dark and bright pixel percentages, and degree of color saturation in an image, wherein the features may be mapped to the subjective judgments input by the inspectors. This dynamic approach to interpreting and annotating exposure levels in imagery can be an effective and efficient mechanism since a wide range of brightness/exposure levels may occur in a single image, for example, in an outdoor scene in an image including a bright white building that is positioned next to a tree-shaded grass park. Additionally, the algorithm may primarily analyze the features of interest in a section of an image that is to be used for street-level map-making (e.g., buildings, roads, landmarks, etc.) while leaving out other features in other sections (e.g., sky) of the image.

In one embodiment, the system 100 may extract exposure-sensitive attributes from an image where a classifier algorithm can map those attributes to human judged exposure level categories. For example, a probabilistic support vector machine based classification algorithm/function may be utilized; however, other classifier mechanisms may be used as well.

In various embodiments, the system 100 may analyze a ROI in an image and determine/compute various attributes associated therewith. In one embodiment, a "highlights" attribute may be determined by a structural similarity (SSIM) index between an original image and its 0.45 gamma transformed version. A gamma of less than one may cause a dark region in an original image to become lighter where new details in the dark region may now be detectable. If a gamma-transformed version of an image is still similar to the original version, then this may indicate that the original image had very few dark regions with a good amount of highlights as no new details were revealed.

In another embodiment, any shadows in a ROI may be determined based on a SSIM index between an original image and its 2.2 gamma transformed version, wherein a gamma of more than one may accentuate shadows (e.g., due to buildings, trees, etc.) in the transformed version of the image. If a gamma transformed version is similar to the original image, this may indicate that the original image had very few highlights, but a good amount of shadows since no new details were revealed.

In some instances, an image may include or be associated with metadata providing information about a geo-location where the image was captured, date, time, type of equipment used for the capture, or the like information, which may be provided by a content/service provider.

In one embodiment, the system 100 may determine digital data associated with a ROI in an image. In one embodiment, the system 100 may access a media content database to determine digital data for a captured image. Next, based on one or more parameters associated with the image, the system 100 may determine a portion of the data associated with a ROI in the image. For example, the ROI may be a certain section/portion of the image.

In one embodiment, the system 100 may process and/or facilitate a processing of the digital data to determine one or more quality attributes associated with the ROI. In one embodiment, the quality attributes may be based, at least in part, on exposure-sensitive attributes including highlights, shadows, dark pixels, washed-out pixels, under-saturated pixels, over-saturated pixels, or a combination thereof.

In one embodiment, the system 100 may cause a comparison of the one or more quality attributes to one or more criteria. In one embodiment, a quality attribute may be based on an exposure level (e.g., a score or a percentage) associated with the ROI in the image, which may be compared to a threshold value (e.g., in a database) for determining a level (e.g., over, under, etc.) of the exposure quality attribute. Further, an exposure score, level, or similar indicators may be compared to subjective exposure level judgements/scores/categories that are provided by human users/inspectors. For example, a certain exposure score for a ROI in an image may be compared to an exposure category given by a user for another ROI in another image.

In one embodiment, the system 100 may cause a generation of one or more classifications for the image based, at least in part, on the comparison. In one embodiment, the one or more classifications include one or more scores associated with a normal exposure, over exposure, under exposure, or a combination thereof. Also, the scores may be probability scores, for example, in the range of zero-to-one (0-1), for each of the classifications. For example, a ROI may include probability scores of normal exposure=0.70, over-exposure=0.20, under-exposure=0.10.

In one embodiment, the system 100 may determine the ROI based, at least in part, on one or more parameters associated with the image. In one embodiment, a ROI within an image may be extracted, for example, by excluding lower and upper portions of the image. The excluded portions may include features or objects that may be of no/low interest (e.g., sky, car blur, etc.) to certain applications or consumers. Additionally, the exposure level classifications/scores of the features that may be excluded should be well represented by the features within the ROI.

In one embodiment, the system 100 may determine the one or more criteria based, at least in part, on one or more other classifications associated with one or more other images, one or more user inputs, or a combination thereof. In one embodiment, the system 100 may utilize one or more machine learning algorithms to analyze and determine the exposure level of an image by using a database including exposure level information on various images where the information may include subjective exposure level judgements/scores previously determined by human inspectors.

In one embodiment, the system 100 may cause a training of one or more classification models based, at least in part, on the one or more classifications. In one instance, data associated with classifications of regions of interest may be utilized to generate a database which may be utilized to train one or more classifying models/algorithms.

In one embodiment, the system 100 may cause a classification of one or more other images based, at least in part, on the one or more classification models. For example, a classification model used to classify an image or a ROI in an image may be utilized to classify one or more other regions of interest in one or more other images. In one embodiment, the one or more other regions of interest may be at one or more other geo-locations. In one example, a classification model used to classify a ROI at one geo-location may be utilized to classify one or more other regions of interest at the same or a different geo-location.

In one embodiment, the system 100 may determine the quality attributes based, at least in part, on exposure-sensitive attributes including highlights, shadows, dark pixels, washed-out pixels, under-saturated pixels, over-saturated pixels, or a combination thereof.

In one embodiment, the system 100 may cause a classification of pixels in the ROI as dark pixels based, at least in part, on a percentage of gray pixels being less than a threshold. In one embodiment, the system 100 may analyze a ROI to determine presence of dark pixels, which may be based on a percentage of gray pixels in the ROI being less than a threshold. In one instance, dark pixels/area may be presented in a left-most area of an image histogram associated with the ROI.

In one embodiment, the system 100 may cause a classification of pixels in the ROI as washed-out pixels based, at least in part, on a percentage of gray pixels being greater than a threshold. In one embodiment, a percentage of gray pixels in the ROI being more than a threshold may be classified as washed-out pixels/area, which may be presented in a right-most area of an image histogram associated with the ROI.

In one embodiment, the system 100 may cause a classification of pixels in the ROI as under-saturated pixels based, at least in part, on a percentage of saturation pixels being less than a threshold. In another embodiment, the system 100 may analyze a ROI to determine presence of under-saturated pixels, which may be based on a percentage of saturation pixels in the ROI being less than a threshold. In one instance, the percentage of under-saturated pixels may indicate a level of under-saturated colors of objects in the ROI which, for example, may be due to environmental variables such as sunny, overcast, foggy, or the like conditions.

In one embodiment, the system 100 may cause a classification of pixels in the ROI as over-saturated pixels based, at least in part, on a percentage of saturation pixels being greater than a threshold. In another embodiment, a percentage of over-saturated pixels being greater than a threshold may be indicative of a level of over-saturated colors of objects in the ROI which, for example, may be due to environmental variables such as sunny, overcast, foggy, or the like conditions.

The system 100 may include user equipment 101a-101n (UE or UEs 101). By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.) The UEs 101 may also include applications 103a-103n (applications 103). By way of example, the applications 103 may be any type of application that is executable at the UE 101, such as location-based service applications, navigation applications, mapping application, sensor monitoring applications, calendar applications, content provisioning services, camera/imaging application, media player applications, social networking applications, and the like The system 100 may also include media capturing platform 105 for capturing various media contents including pictures, video, audio, etc. Additionally, the media capturing platform 105 may include sensors 107a-107n (sensors 107). By way of example, the sensors 107 may be any type of sensor, which may interface with or be included in the media capturing platform 105. In certain embodiments, the sensors 107 may include, for example, a global positioning sensor for gathering location data (e.g., GPS), a network detection sensor for detecting wireless signals or receivers for different short-range communications (e.g., BLOOTOOTH®, WI-FI®, Light Fidelity (LI-FI), near field communication, etc.), temporal information sensor, a camera/imaging sensor for gathering image data, an audio recorder for gathering audio data, and the like. In one scenario, the sensors 107 may include, light sensors, orientation sensors augmented with height sensing and acceleration sensing, tilt sensors to detect the degree of incline or decline of the vehicle along a path of travel, moisture sensors, pressure sensors, etc. In one embodiment, the media capturing platform 105 may include GPS receivers to obtain geographic coordinates from satellites 109 for determining current location and time associated with the media capturing platform 105. In another embodiment, the sensors 107 may be a LIDAR device or sensor, a laser device, and/or other device that collects data points, such as three dimensional data, by transmitting and receiving light. For example, the LIDAR sensors use one or more lasers to collect data points representing on-ground objects in a surrounding area. The LIDAR sensors may collect and gather data points in a point cloud, such as a three dimensional point cloud, in which each data point corresponds to a local coordinate, such as (x, y, z). In one scenario, LIDAR sensors not only collect street level (i.e., outdoor) 3D point clouds, but also indoor three dimensional point clouds.

In one embodiment, the system 100 may include a media database 111 that may include various content types, e.g., pictures, video, audio, related data, etc., associated with various geo-locations or points of interest (POIs). In one instance, the media database 111 may include imagery and related data captured by the media capturing platform 105, wherein the imagery and related data may be processed and/or made available to one or more entities of the system 100. For example, a content provider may capture imagery along a driving route in a city and deposit the imagery and any related data into the media database 111. In various scenarios, one or more entities of the system 100 may have access to the media database 111.

By way of example, a communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WIMAX™), Long Term Evolution (LTE) networks, code division multiple access (CDMA), wideband code division multiple access (WCDMA), wireless fidelity (WI-FI®), wireless LAN (WLAN), BLUETOOTH®, Internet Protocol (IP) data casting, satellite, mobile ad-hoc network (MANET), and the like, or any combination thereof.

In one embodiment, a classification platform 115 may include multiple interconnected components. The classification platform 115 may include multiple servers, intelligent networking devices, computing devices, algorithms, components and corresponding software for classifying media contents, e.g., imagery, associated with a geo-location and providing information/scores associated with one or more quality attributes associated with the media contents. Example components of the classification platform 115 will be illustrated in FIG. 2 and further discussed.

In one embodiment, the classification platform 115 may include or have access to the media database 111 for accessing or storing any kind of media and associated data, such as classification information, one or more quality attribute scores, one or more contextually relevant geo-location points, location proximity information, temporal information, contextual information, historical user information, etc. Media and data stored in the media database 111 may, for instance, be provided by the UE 101, the media capturing platform 105, one or more services providers 117a-117n (services 117), or one or more content providers 119a-119n (content providers 119). The media database 111 may also include data about places, such as cities, towns, or other communities, and other geographic features, such as bodies of water, mountain ranges, buildings, etc. that may be associated with the media contents. The media database 111 may be maintained by the content providers 119 and/or the services 117 (e.g., a map developer). In one instance, a map developer may collect media content and geographic data to generate and/or enhance the media database 111. The data may be obtained from various sources, such as municipalities or respective geographic authorities. In addition, remote sensing, such as aerial or satellite photography, may be used.

The services 117 may include any type of service. By way of example, the services 117 may include mapping services, navigation services, social networking services, content (e.g., audio, video, images, etc.) provisioning services, application services, storage services, contextual information determination services, location based services, information (e.g., weather, news, etc.) based services, etc. In one embodiment, the services 117 may interact with the UE 101, the classification platform 115 and the content providers 119 to supplement or aid in the processing of media content and related information (e.g., location information). The services 117 allow users to share location information, navigation related information, activities information, contextual information, historical user information and interests within their individual networks, and provides for data portability.

The content providers 119 may provide content to the UE 101, the media database 111, or the services 117. The content provided may be any type of content, such as textual content, image content, video content etc. In one embodiment, the content providers 119 may provide content that may supplement content of the media capturing platform 105. In another embodiment, the content providers 119 may also store content associated with the UE 101, the classification platform 115, and the services 117. In a further embodiment, the content providers 119 may manage access to a central repository of media contents and data, and offer a consistent, standard interface to the media and data.

By way of example, the UE 101, the classification platform 115, the services 117, and the content providers 119 may communicate with each other and other components of the communication network 113 using well known, new or still developing wired or wireless communication protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
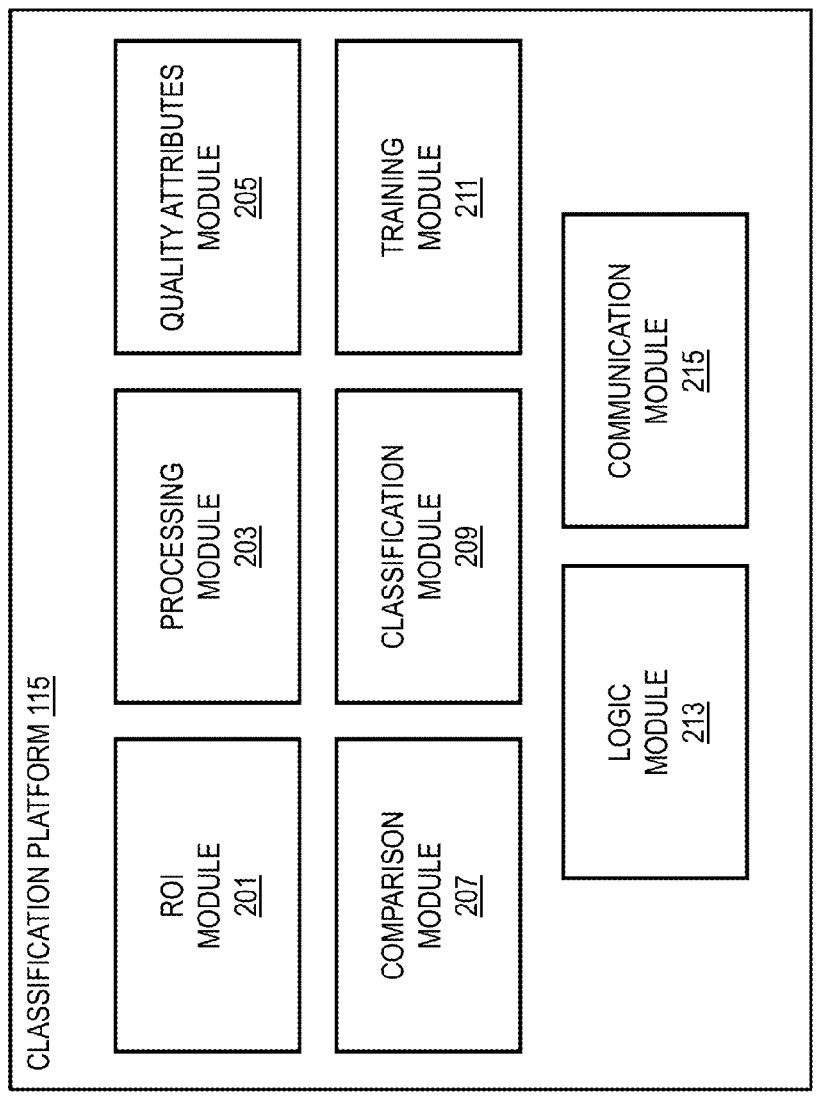
FIG. 2 is a diagram of the components of a classification platform, according to one embodiment.

FIG. 2 is a diagram of the components of the classification platform 115, according to one embodiment. By way of example, the classification platform 115 may include one or more components for classifying media content, e.g., a picture, of a geo-location and providing quality information associated with the media content. In one embodiment, the classification platform 115 may include a ROI module 201, a processing module 203, a quality attributes module 205, a comparison module 207, a classification module 209, a training module 211, a logic module 213, and a communication module 215. It is contemplated that the functions of these components may be combined in one or more components or performed by other components with similar functionalities.

In one embodiment, the ROI module 201 may determine a ROI associated with an image of a geo-location, wherein the ROI may be a predetermined section/portion of the image. In one example, a ROI may be based on various parameters associated with an image; for example, a type of an image, size of an image, geo-location of the image, objects or POIs present in the image, or the parameters. In one embodiment, a ROI within an image may be extracted, for example, by excluding lower and upper portions of the image. The excluded portions may include features or objects that may be of no/low interest (e.g., sky, car blur, etc.) to certain applications or consumers.

In one embodiment, the processing module 203 may determine and process digital data associated with a ROI in an image. In one embodiment, the processing module 203 may access a media content database to determine digital data for a captured image. Next, based on one or more parameters associated with the image, the system 100 may determine a portion of the digital data associated with the ROI in the image. For example, the ROI may be a certain section/portion of the image.

In one embodiment, the quality attributes module 205 may request/utilize digital data output from the processing module 203 to determine one or more quality attributes associated with the ROI. In one embodiment, the quality attributes module 205 may further process the output of the processing module 203 or utilize the processed digital data to further determine the quality attributes that may be based on exposure-sensitive attributes including highlights, shadows, dark pixels, washed-out pixels, under-saturated pixels, over-saturated pixels, etc.

In one embodiment, a "highlights" attribute may be determined by a structural similarity (SSIM) index between an original image and its 0.45 gamma transformed version. A gamma of less than one may cause a dark region in an original image to become lighter where new details in the dark region may now be detectable. If a gamma-transformed version of an image is still similar to the original version, then this may indicate that the original image had very few dark regions with a good amount of highlights as no new details were revealed.

In another embodiment, any shadows in a ROI may be determined based on a SSIM index between an original image and its 2.2 gamma transformed version, wherein a gamma of more than one may accentuate shadows (e.g., due to buildings, trees, etc.) in the transformed version of the image. If a gamma transformed version is similar to the original image, this may indicate that the original image had very few highlights, but a good amount of shadows since no new details were revealed.

In one embodiment, dark pixels may be determined based on a percentage of gray pixels in the ROI being less than a threshold. In one instance, dark pixels/area may be presented in a left-most area of an image histogram associated with the ROI. In one embodiment, a percentage of gray pixels in the ROI being more than a threshold may be classified as washed-out pixels/area, which may be presented in a right-most area of an image histogram associated with the ROI.

In another embodiment, the quality attributes module 205 may analyze a ROI to determine presence of under-saturated pixels, which may be based on a percentage of saturation pixels in the ROI being less than a threshold. In one instance, the percentage of under-saturated pixels may indicate a level of under-saturated colors of objects in the ROI which, for example, may be due to environmental variables such as sunny, overcast, foggy, or the like conditions. In another embodiment, a percentage of over-saturated pixels being greater than a threshold may be indicative of a level of over-saturated colors of objects in the ROI which, for example, may be due to environmental variables such as sunny, overcast, foggy, or the like conditions.

In one embodiment, the comparison module 207 may compare the one or more quality attributes to one or more criteria. In one embodiment, a quality attribute may be based on an exposure level (e.g., a score or a percentage) associated with the ROI in the image, which may be compared to a threshold value (e.g., in a database) for determining a level (e.g., over, under, etc.) of the exposure quality attribute. Further, an exposure score, level, or similar indicators may be compared to subjective exposure level judgements/scores/categories that are provided by human users/inspectors. For example, a certain exposure score for a ROI in an image may be compared to an exposure category given by a user for another ROI in another image.

In one embodiment, the classification module 209 may utilize one or more classifying algorithms (e.g., machine learning algorithms) to determine and generate of one or more classifications for the image based, at least in part, on the comparison. In one embodiment, the one or more classifications include one or more scores associated with a normal exposure, over exposure, under exposure, or a combination thereof. Also, the scores may be probability scores, for example, in the range of zero-to-one (0-1), for each of the classifications. For example, a ROI may include probability scores of normal exposure=0.70, over-exposure=0.20, under-exposure=0.10.

In one embodiment, the training module 211 may cause a training of one or more classification models based, at least in part, on the one or more classifications. In one instance, data associated with classifications of ROIs may be utilized to generate a database which may be utilized to train one or more classifying models/algorithms. Further, the training module 211 may update the classification module 209 with updated scores, information, etc. for use in classification of one or more other ROIs based on the one or more classification models. For example, a classification model used to classify a ROI may be utilized to classify one or more other ROIs in one or more other images at the same or a different geo-location.

In one embodiment, the logic module 213 may manage tasks, including tasks performed by the other modules. For example, although the other modules may perform their actual tasks, the logic module 213 may determine when and how those tasks are performed or otherwise direct the other modules to perform the task. In one embodiment, the logic module 213 may determine to process digital data of imagery in substantially real-time, batch mode, according to a schedule, or a combination thereof. By way of example, the schedule may be based, at least in part, on computational resources, amount of available data, etc.

The communication module 215 may be used for communication between various elements of the system 100 as well as between modules, elements, components, etc. of the classification platform 115. For example, the communication module 215 may be used to communicate commands, requests, data, etc., to/from the classification platform 115, media database 111, the content providers 119, or the like.

Figure 3:
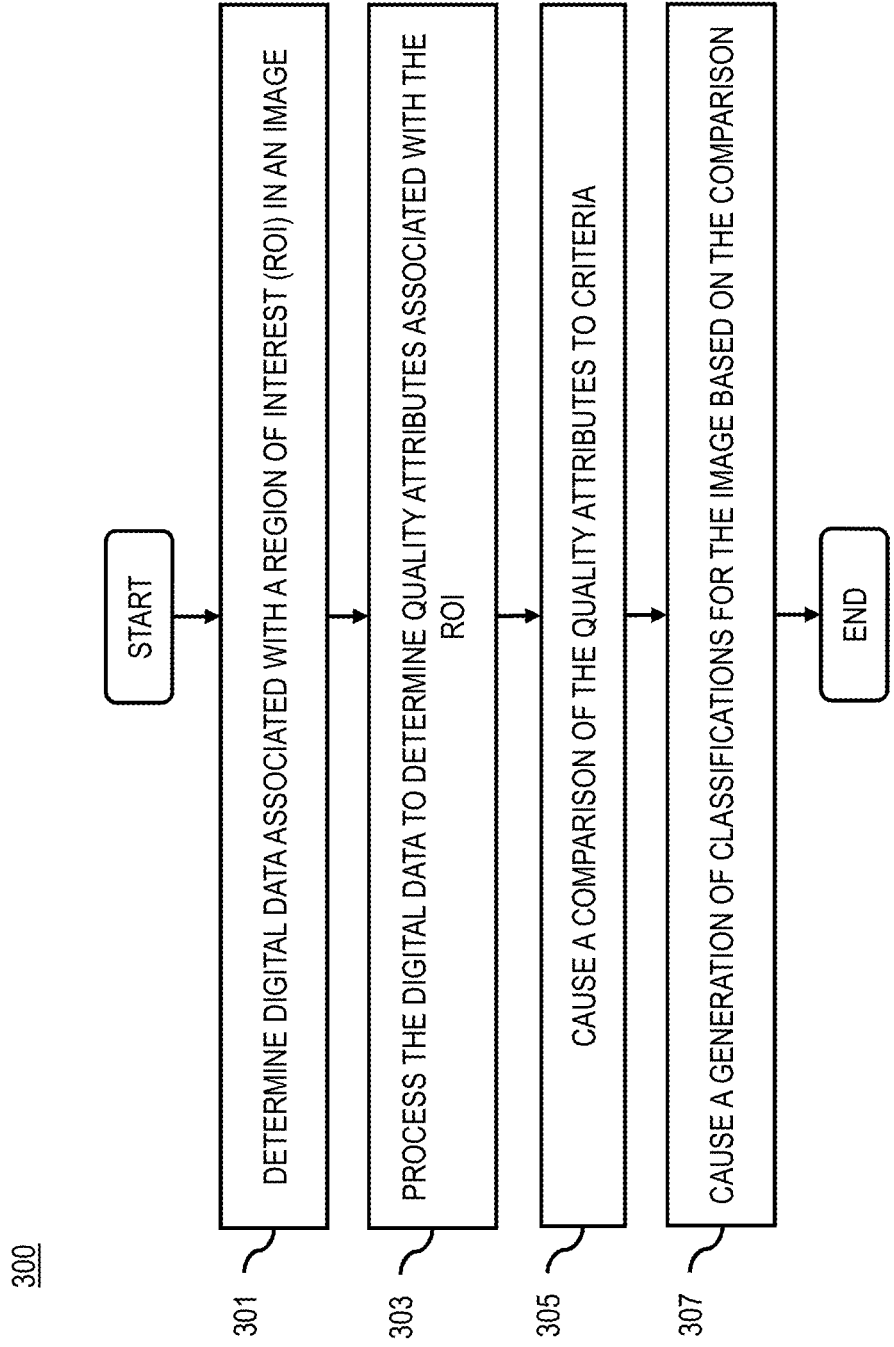
Figure 4:
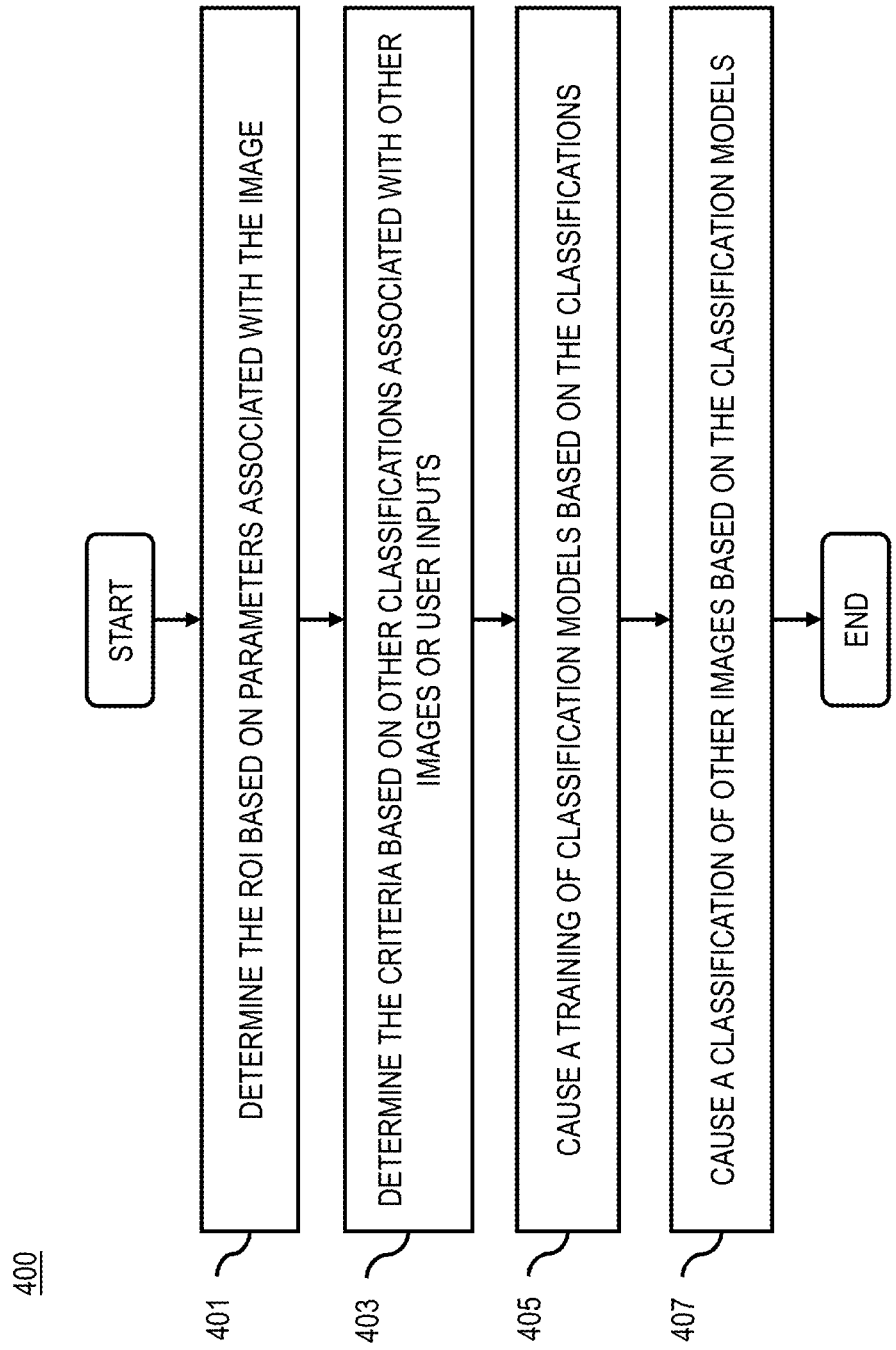
Figure 8:
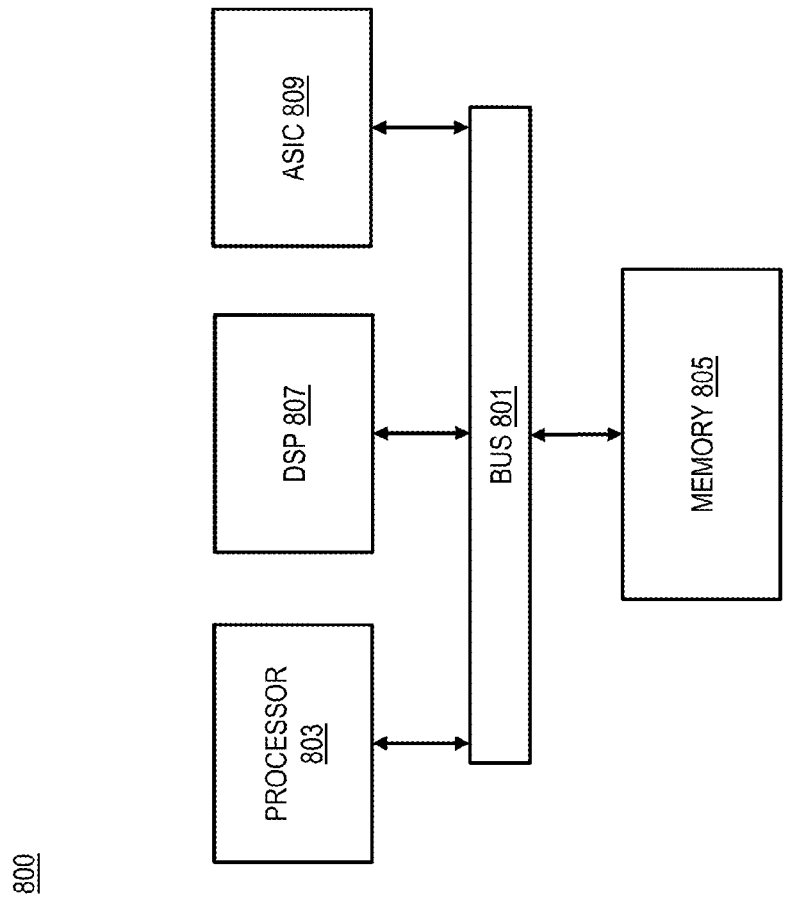
FIG. 8 is a diagram of a chip set that can be used to implement an embodiment of the invention.

FIGS. 3 through 5 are flowcharts of various processes for, at least, automated analysis and classification of quality characteristics associated with captured imagery for use in map applications, navigation systems, etc., according to various embodiments. In various embodiments, the classification platform 115 may perform one or more portions of the processes 300, 400, and 500 which may be implemented in, for instance, a chip set including a processor and a memory as shown in FIG. 8. As such, the classification platform 115 can provide means for accomplishing various parts of the process 300, 400, and 500 as well as means for accomplishing other processes in conjunction with other components of the system 100. Throughout these processes, the classification platform 115 may be referred to as completing various portions of the processes 300, 400, and 500, however, it is understood that other components of the system 100 can perform some of and/or all of the process steps. Further, for clarity in discussing the 300, 400, and 500 processes, the classification platform 115 is referred to as completing various steps of said processes; however, said processes and/or example steps described therein may be performed in any suitable order and/or may be optional.

The process 300 may begin at step 301 of the FIG. 3, where the classification platform 115 may determine digital data associated with a ROI in an image. In one embodiment, the classification platform 115 may access a media content database to determine digital data for a captured image. Next, based on one or more parameters associated with the image, the system 100 may determine a portion of the data associated with a ROI in the image. For example, the ROI may be a certain section/portion of the image.

In step 303, the classification platform 115 may process and/or facilitate a processing of the digital data to determine one or more quality attributes associated with the ROI. In one embodiment, the quality attributes may be based, at least in part, on exposure-sensitive attributes including highlights, shadows, dark pixels, washed-out pixels, under-saturated pixels, over-saturated pixels, or a combination thereof.

In step 305, the classification platform 115 may cause a comparison of the one or more quality attributes to one or more criteria. In one embodiment, a quality attribute may be based on an exposure level (e.g., a score or a percentage) associated with the ROI in the image, which may be compared to a threshold value (e.g., in a database) for determining a level (e.g., over, under, etc.) of the exposure quality attribute. Further, an exposure score, level, or similar indicators may be compared to subjective exposure level judgements/scores/categories that are provided by human users/inspectors. For example, a certain exposure score for a ROI in an image may be compared to an exposure category given by a user for another ROI in another image.

In step 307, the classification platform 115 may cause a generation of one or more classifications for the image based, at least in part, on the comparison. In one embodiment, the one or more classifications include one or more scores associated with a normal exposure, over exposure, under exposure, or a combination thereof. Also, the scores may be probability scores, for example, in the range of zero-to-one (0-1), for each of the classifications. For example, a ROI may include probability scores of normal exposure=0.70, over-exposure=0.20, under-exposure=0.10.

The process 400 may begin at step 401 of the FIG. 4, where the classification platform 115 may determine the ROI based, at least in part, on one or more parameters associated with the image. In one embodiment, a ROI within an image may be extracted, for example, by excluding lower and upper portions of the image. The excluded portions may include features or objects that may be of no/low interest (e.g., sky, car blur, etc.) to certain applications or consumers. Additionally, the exposure level classifications/scores of the features that may be excluded should be well represented by the features within the ROI.

In step 403, the classification platform 115 may determine the one or more criteria based, at least in part, on one or more other classifications associated with one or more other images, one or more user inputs, or a combination thereof. In one embodiment, the system 100 may utilize one or more machine learning algorithms to analyze and determine the exposure level of an image by using a database including exposure level information on various images where the information may include subjective exposure level judgements/scores previously determined by human inspectors.

In step 405, the classification platform 115 may cause a training of one or more classification models based, at least in part, on the one or more classifications. In one instance, data associated with classifications of regions of interest may be utilized to generate a database which may be utilized to train one or more classifying models/algorithms.

In step 407, the classification platform 115 may cause a classification of one or more other images based, at least in part, on the one or more classification models. For example, a classification model used to classify an image or a ROI in an image may be utilized to classify one or more other regions of interest in one or more other images. In one embodiment, the one or more other regions of interest may be at one or more other geo-locations. In one example, a classification model used to classify a ROI at one geo-location may be utilized to classify one or more other regions of interest at the same or a different geo-location.

The process 500 may begin at step 501 of the FIG. 5, where the classification platform 115 may determine the quality attributes based, at least in part, on exposure-sensitive attributes including highlights, shadows, dark pixels, washed-out pixels, under-saturated pixels, over-saturated pixels, or a combination thereof.

In step 503, the classification platform 115 may cause a classification of pixels in the ROI as dark pixels based, at least in part, on a percentage of gray pixels being less than a threshold. In one embodiment, the system 100 may analyze a ROI to determine presence of dark pixels, which may be based on a percentage of gray pixels in the ROI being less than a threshold. In one instance, dark pixels/area may be presented in a left-most area of an image histogram associated with the ROI.

In step 505, the classification platform 115 may cause a classification of pixels in the ROI as washed-out pixels based, at least in part, on a percentage of gray pixels being greater than a threshold. In one embodiment, a percentage of gray pixels in the ROI being more than a threshold may be classified as washed-out pixels/area, which may be presented in a right-most area of an image histogram associated with the ROI.

In step 507, the classification platform 115 may cause a classification of pixels in the ROI as under-saturated pixels based, at least in part, on a percentage of saturation pixels being less than a threshold. In another embodiment, the system 100 may analyze a ROI to determine presence of under-saturated pixels, which may be based on a percentage of saturation pixels in the ROI being less than a threshold. In one instance, the percentage of under-saturated pixels may indicate a level of under-saturated colors of objects in the ROI which, for example, may be due to environmental variables such as sunny, overcast, foggy, or the like conditions.

In step 509, the classification platform 115 may cause a classification of pixels in the ROI as over-saturated pixels based, at least in part, on a percentage of saturation pixels being greater than a threshold. In another embodiment, a percentage of over-saturated pixels being greater than a threshold may be indicative of a level of over-saturated colors of objects in the ROI which, for example, may be due to environmental variables such as sunny, overcast, foggy, or the like conditions.

FIGS. 6A through 6G illustrate example captured imagery including a wide range of exposure levels and physical environments, according to various embodiments. It is noted, that although these figures are presented in a gray scale color scheme, multi-color versions of these figures can illustrate other exposure effects such as color saturation in objects shown in the figures.

Figure 6A:
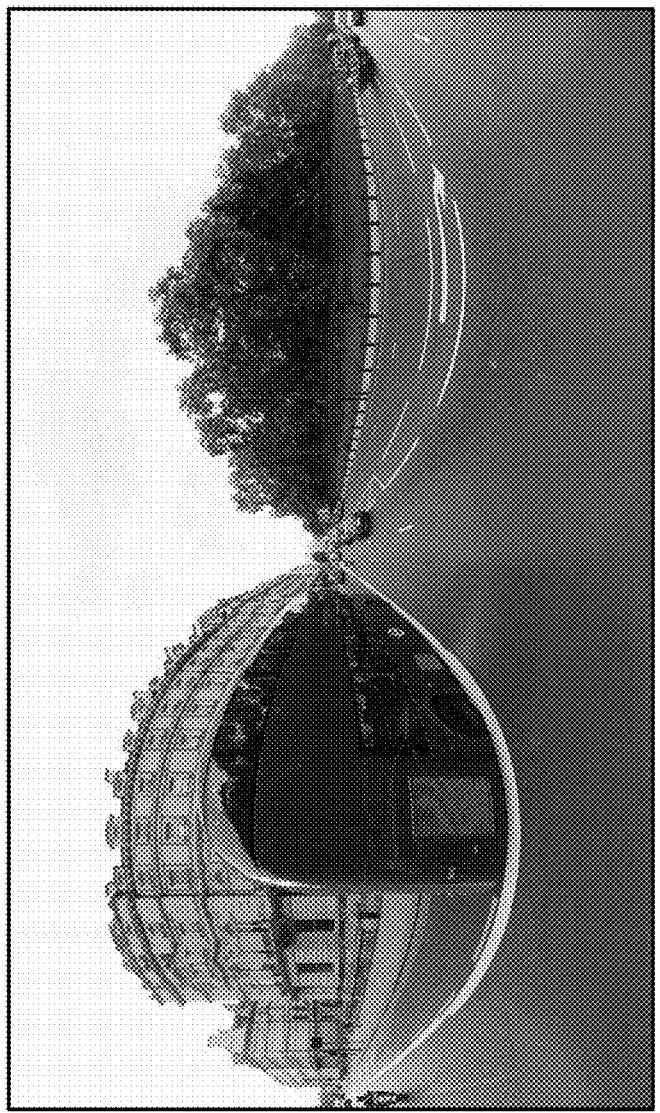

FIG. 6A illustrates an image 600 that shows a roadway including automobiles, buildings, trees, overcast sky, etc. In this example, a classification platform 115 may determine a normal exposure classification for the image 600 (e.g., based on an ROI of the image 600) with probability scores of 0.71 for normal-exposure, 0.17 for over-exposure, and 0.12 for under-exposure.

Figure 6B:
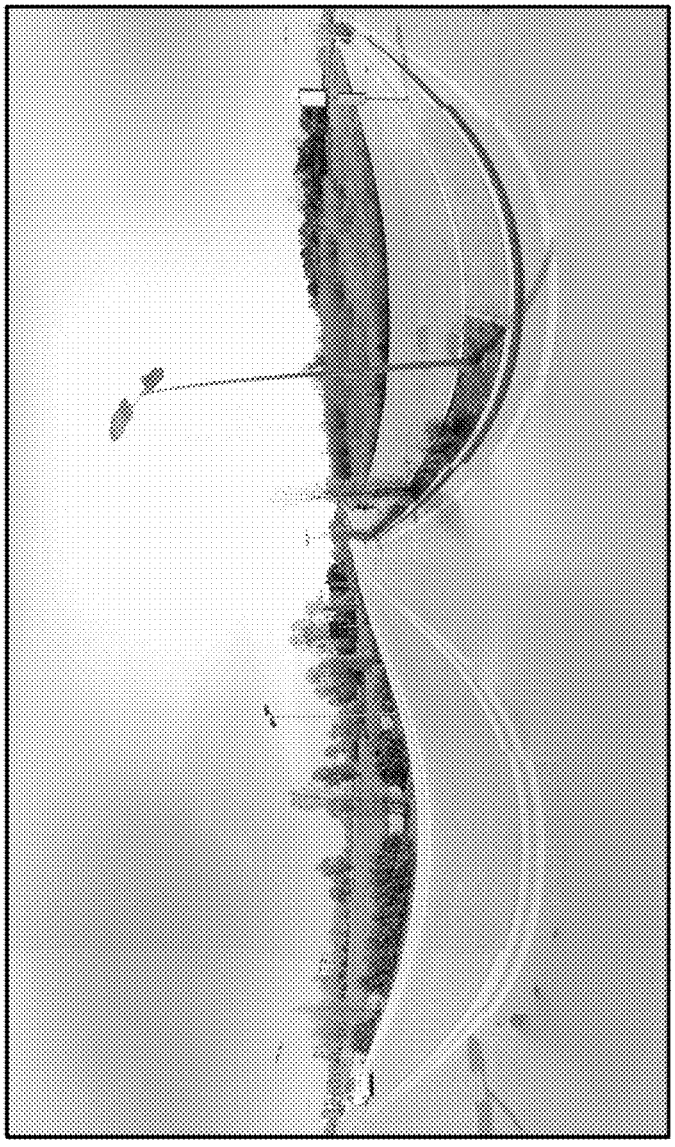

FIG. 6B illustrates an image 610 that shows a roadway near open spaces with a bright cloudless sky. In this example, a classification platform 115 may determine a normal exposure classification for the image 610 (e.g., based on an ROI of the image 610) with probability scores of 0.60 for normal-exposure, 0.25 for over-exposure, and 0.14 for under-exposure.

FIG. 6C illustrates an image 620 that shows a roadway including open spaces and buildings, shadows of tree canopies, etc. In this example, a classification platform 115 may determine a normal exposure classification for the image 620 (e.g., based on an ROI of the image 620) with probability scores of 0.60 for normal-exposure, 0.21 for over-exposure, and 0.20 for under-exposure.

Figure 6D:
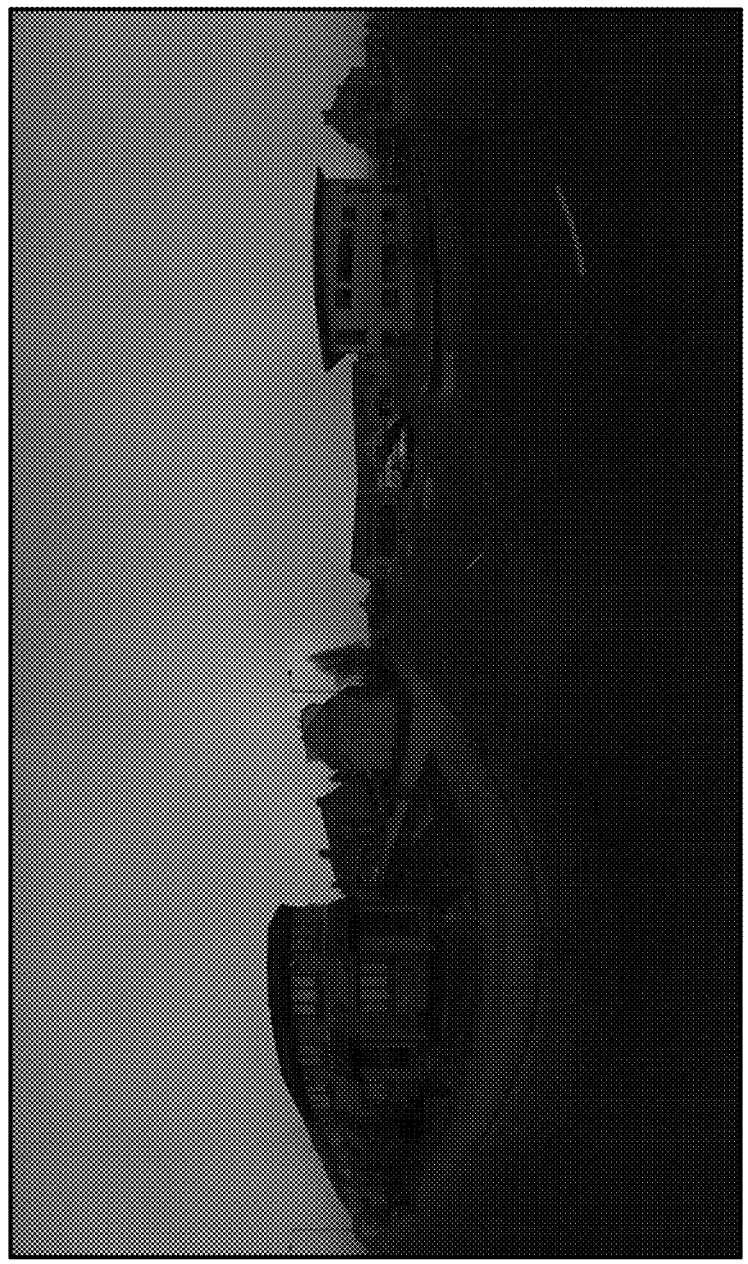

FIG. 6D illustrates an image 630 that shows a roadway including buildings in a pre-dawn setting. In this example, a classification platform 115 may determine an under-exposure classification for the image 630 (e.g., based on an ROI of the image 630) with probability scores of 0.20 for normal-exposure, 0.15 for over-exposure, and 0.64 for under-exposure.

Figure 6E:

FIG. 6E illustrates an image 640 that shows a country dirt road including open spaces and heavy vegetation. In this example, a classification platform 115 may determine an under-exposure classification for the image 640 (e.g., based on an ROI of the image 640) with probability scores of 0.21 for normal-exposure, 0.17 for over-exposure, and 0.63 for under-exposure.

Figure 6F:
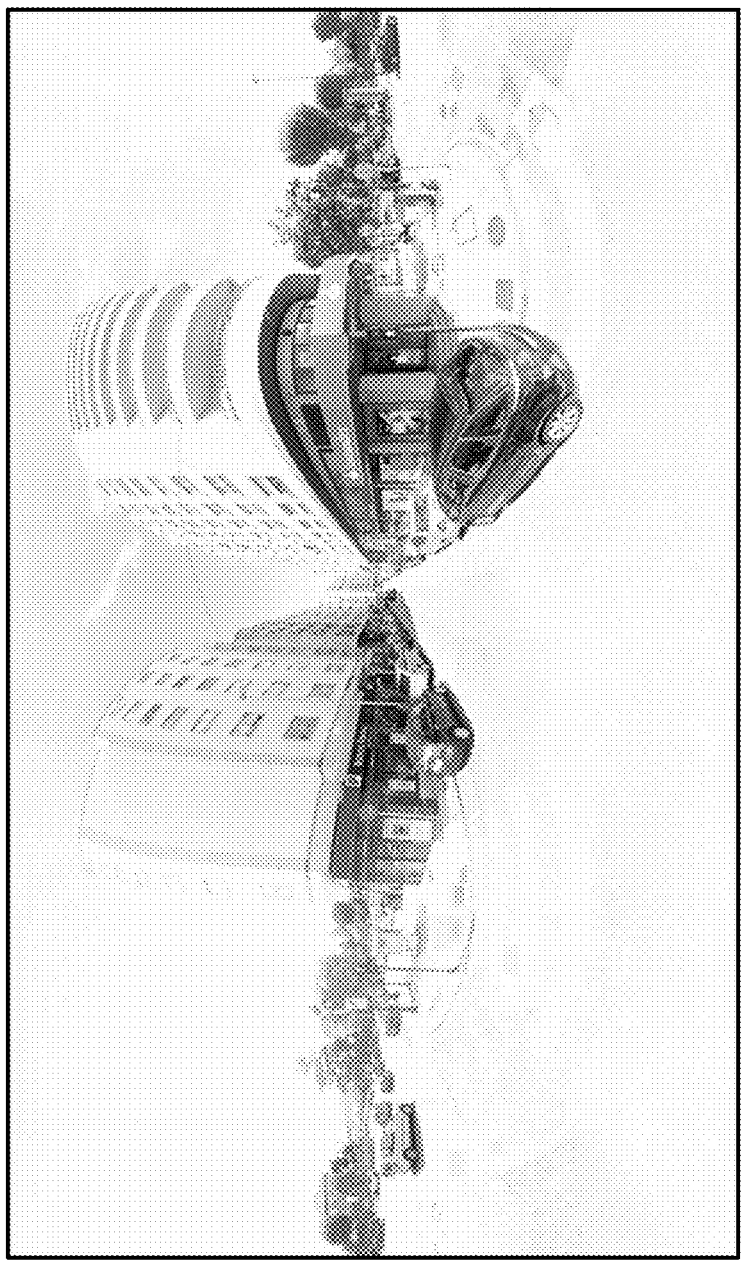

FIG. 6F illustrates an image 650 that shows a roadway in an urban area including buildings, automobiles, etc. In this example, a classification platform 115 may determine an over-exposure classification for the image 650 (e.g., based on an ROI of the image 650) with probability scores of 0.13 for normal-exposure, 0.62 for over-exposure, and 0.25 for under-exposure.

Figure 6G:
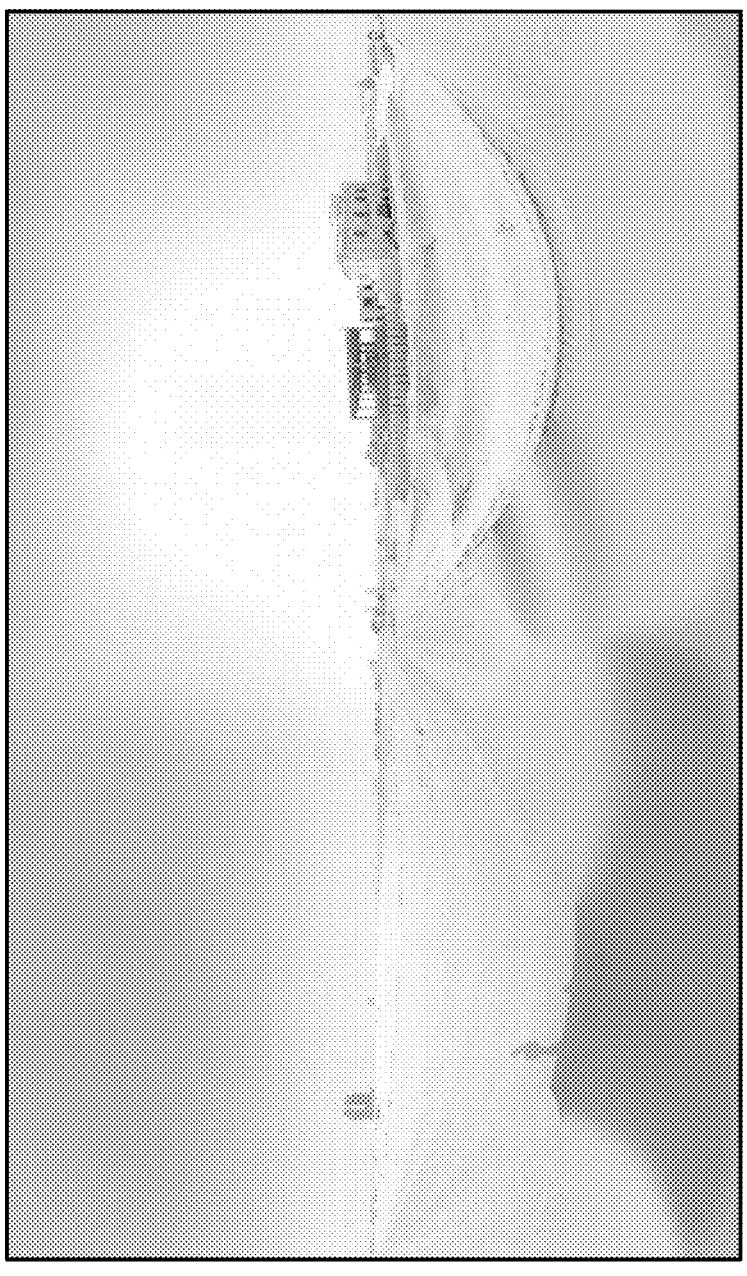

FIG. 6G illustrates an image 660 that shows a roadway in a desert area including open spaces and a bright sky. In this example, a classification platform 115 may determine an over-exposure classification for the image 660 (e.g., based on an ROI of the image 660) with probability scores of 0.16 for normal-exposure, 0.62 for over-exposure, and 0.22 for under-exposure.

The processes described herein for automated analysis and classification of quality characteristics associated with captured imagery may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
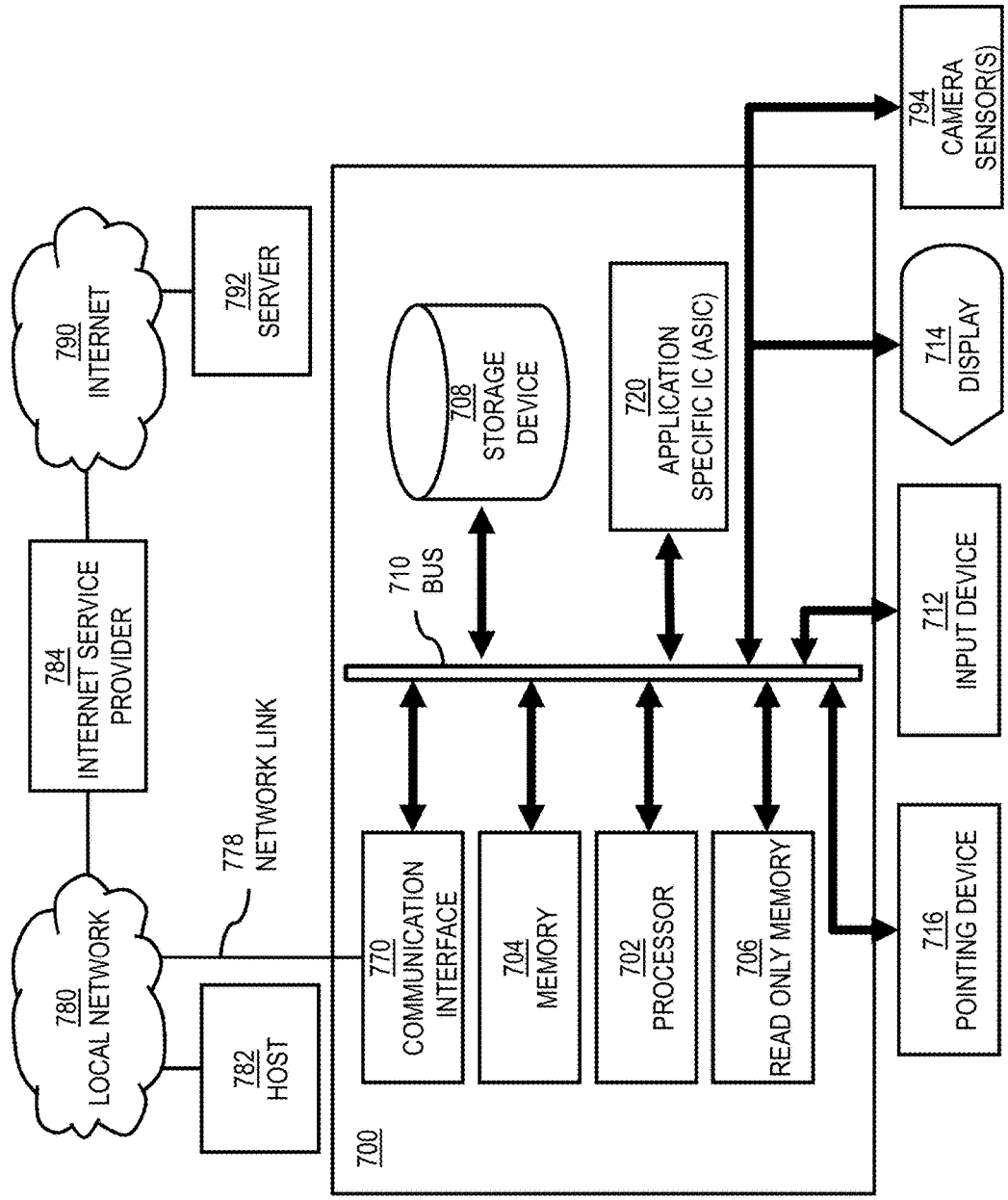
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to classify objects that are present at a geo-location and provide an uncluttered presentation of images of some of the objects in an application such as a map application as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of automated analysis and classification of quality characteristics associated with captured imagery.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to automated analysis and classification of quality characteristics associated with captured imagery. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for automated analysis and classification of quality characteristics associated with captured imagery. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for automated analysis and classification of quality characteristics associated with captured imagery, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714, and one or more camera sensors 794 for capturing, recording and causing to store one or more still and/or moving images (e.g., videos, movies, etc.) which also may comprise audio recordings. In some embodiments, for example, in embodiments in which the computer system 700 performs all functions automatically without human input, one or more of external input device 712, display device 714 and pointing device 716 may be omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 113 for automated analysis and classification of quality characteristics associated with captured imagery.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to classify objects that are present at a geo-location and provide an uncluttered presentation of images of some of the objects in an application such as a map application as described herein and includes, for instance, the processor and memory components described with respect to FIG. 8 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of automated analysis and classification of quality characteristics associated with captured imagery.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to classify objects that are present at a geo-location and provide an uncluttered presentation of images of some of the objects in an application such as a map application. The memory 805 also stores the data associated with or generated by the execution of the inventive steps.

Figure 9:
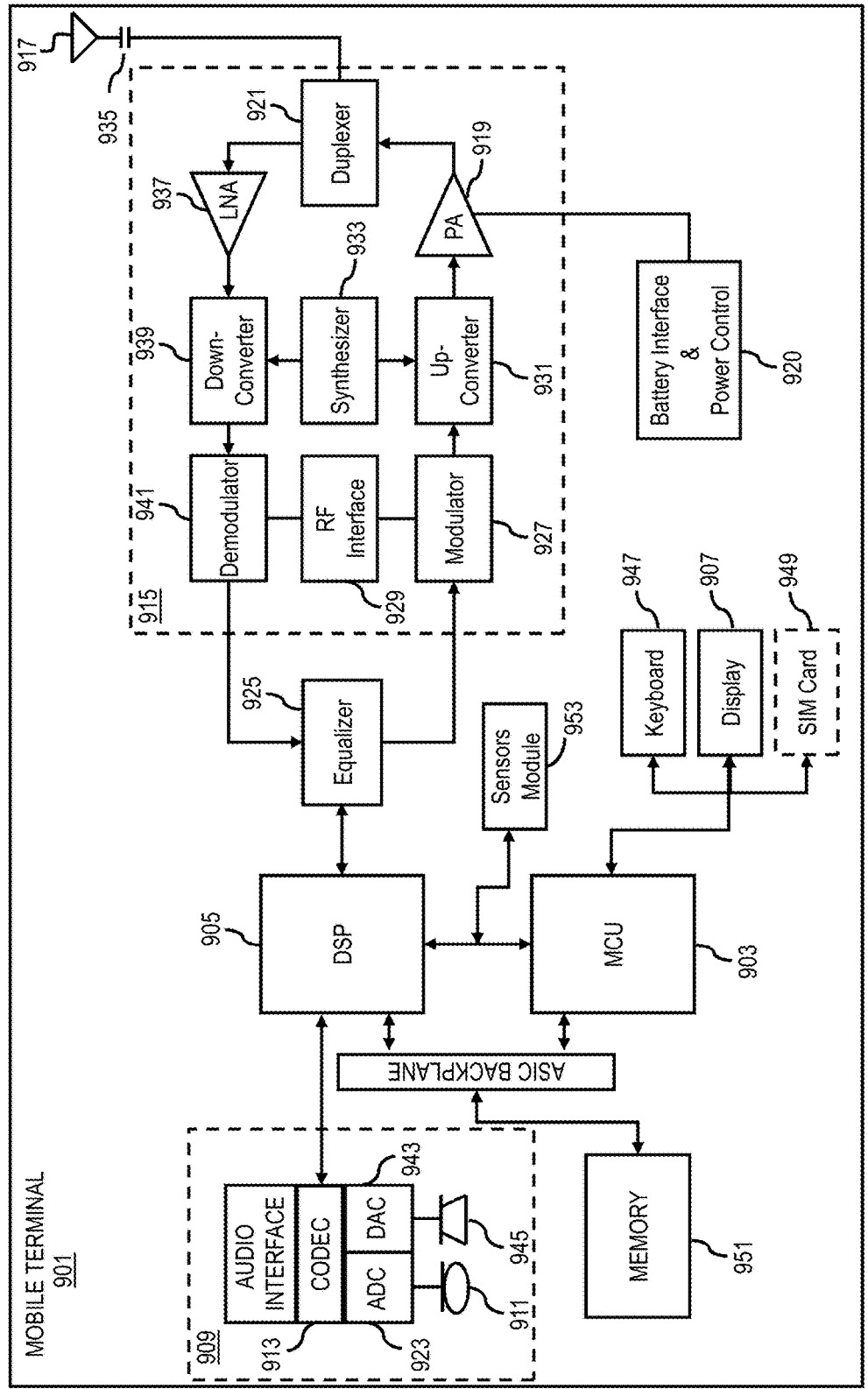
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of automated analysis and classification of quality characteristics associated with captured imagery. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of automated analysis and classification of quality characteristics associated with captured imagery. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WIMAX™), Long Term Evolution (LTE) networks, code division multiple access (CDMA), wideband code division multiple access (WCDMA), wireless fidelity (WIFI®), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to classify objects that are present at a geo-location and provide an uncluttered presentation of images of some of the objects in an application such as a map application. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Additionally, a sensors module 953 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 901 (e.g., a mobile phone), a user of the mobile terminal 901, an environment of the mobile terminal 901 and/or the user, or a combination thereof, wherein the data may be collected, processed, stored, and/or shared with one or more components and/or modules of the mobile terminal 901 and/or with one or more entities external to the mobile terminal 901.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. The methods and systems (including steps and components thereof) can be mixed, matched, and/or rearranged. Additionally more, fewer, or different method steps or device/system components may be used.

What is claimed is:

1. A method comprising:
retrieving, by a processor, digital data associated with an image utilized in a map application or navigation system, wherein the image is associated with metadata providing at least information about a geo-location where the image was captured and type of equipment used to capture the image;
selecting, by the processor, a region of interest in the image based on a subset of the digital data associated with a section of the image, wherein the selecting includes excluding portions of the image including features or objects that are of no or low interest;
processing, by the processor, of the subset of the digital data to determine one or more quality attributes associated with the region of interest, wherein the quality attributes are based, at least in part, on exposure-sensitive attributes including highlights, shadows, dark pixels, washed-out pixels, under-saturated pixels, over-saturated pixels, or a combination thereof, and wherein the exposure-sensitive attributes are represented by features within the region of interest;
comparing the one or more quality attributes to one or more criteria;
generating one or more classifications for the image based, at least in part, on the comparison; and
determining the one or more criteria based, at least in part, on one or more other classifications associated with one or more other images and one or more user inputs, wherein the one or more user inputs include subjective exposure level information of the one or more other images previously determined by one or more human inspectors.

2. The method of claim 1, further comprising:
determining the region of interest based, at least in part, on one or more parameters associated with the image.

3. The method of claim 1, further comprising:
training one or more classification models based, at least in part, on the one or more classifications; and
classifying one or more other images based, at least in part, on the one or more classification models.

4. The method of claim 1, further comprising:
classifying pixels in the region of interest as dark pixels based, at least in part, on a percentage of gray pixels being less than a threshold.

5. The method of claim 1, further comprising:
classifying pixels in the region of interest as washed-out pixels based, at least in part, on a percentage of gray pixels being greater than a threshold.

6. The method of claim 1, further comprising:
classifying pixels in the region of interest as under-saturated pixels based, at least in part, on a percentage of saturation pixels being less than a threshold.

7. The method of claim 1, further comprising:
classifying pixels in the region of interest as over-saturated pixels based, at least in part, on a percentage of saturation pixels being greater than a threshold.

8. The method of claim 1, wherein the one or more classifications include one or more scores associated with a normal exposure, over exposure, under exposure, or a combination thereof.

9. An apparatus comprising:
at least one processor; and
at least one memory including computer program code for one or more programs,
the at least one memory and the computer program code configured to, with the at least one processor, cause the apparatus to perform at least the following:
retrieve digital data associated with an image utilized in a map application or navigation system, wherein the image is associated with metadata providing at least information about a geo-location where the image was captured and type of equipment used to capture the image;
select a region of interest in the image based on a subset of the digital data associated with a section of the image, wherein the selecting includes excluding portions of the image including features or objects that are of no or low interest;
process the subset of the digital data to determine one or more quality attributes associated with the region of interest, wherein the quality attributes are based, at least in part, on exposure-sensitive attributes including highlights, shadows, dark pixels, washed-out pixels, under-saturated pixels, over-saturated pixels, or a combination thereof, and wherein the exposure-sensitive attributes are represented by features within the region of interest;
compare the one or more quality attributes to one or more criteria;
generate one or more classifications for the image based, at least in part, on the comparison; and
determine the one or more criteria based, at least in part, on one or more other classifications associated with one or more other images and one or more user inputs, wherein the one or more user inputs include subjective exposure level information of the one or more other images previously determined by one or more human inspectors.

10. The apparatus of claim 9, wherein the apparatus is further caused to:
determine the region of interest based, at least in part, on one or more parameters associated with the image.

11. The apparatus of claim 9, wherein the apparatus is further caused to:
train one or more classification models based, at least in part, on the one or more classifications; and
classify one or more other images based, at least in part, on the one or more classification models.

12. The apparatus of claim 9, wherein the apparatus is further caused to:
classify pixels in the region of interest as dark pixels based, at least in part, on a percentage of gray pixels being less than a threshold; and
classify pixels in the region of interest as washed-out pixels based, at least in part, on a percentage of gray pixels being greater than a threshold.

13. The apparatus of claim 9, wherein the apparatus is further caused to:
classify pixels in the region of interest as under-saturated pixels based, at least in part, on a percentage of saturation pixels being less than a threshold; and classify pixels in the region of interest as over-saturated pixels based, at least in part, on a percentage of saturation pixels being greater than a threshold.

14. A computer-readable non-transitory storage medium carrying one or more sequences of one or more instructions which, when executed by one or more processors, cause an apparatus to perform:
   retrieve digital data associated with an image utilized in a map application or navigation system, wherein the image is associated with metadata providing at least information about a geo-location where the image was captured and type of equipment used to capture the image;
   select a region of interest in the image based on a subset of the digital data associated with a section of the image, wherein the selecting includes excluding portions of the image including features or objects that are of no or low interest;
   process the subset of the digital data to determine one or more quality attributes associated with the region of interest, wherein the quality attributes are based, at least in part, on exposure-sensitive attributes including highlights, shadows, dark pixels, washed-out pixels, under-saturated pixels, over-saturated pixels, or a combination thereof, and wherein the exposure-sensitive attributes are represented by features within the region of interest;
   compare the one or more quality attributes to one or more criteria;
   generate one or more classifications for the image based, at least in part, on the comparison; and
   determine the one or more criteria based, at least in part, on one or more other classifications associated with one or more other images and one or more user inputs, wherein the one or more user inputs include subjective exposure level information of the one or more other images previously determined by one or more human inspectors.

15. The computer-readable non-transitory storage medium of claim 14, wherein the apparatus is further caused to perform:
   train one or more classification models based, at least in part, on the one or more classifications; and
   classify one or more other images based, at least in part, on the one or more classification models.

* * * * *